United States Patent
Chen et al.

(10) Patent No.: US 9,273,746 B2
(45) Date of Patent: Mar. 1, 2016

(54) SUSPENSION DAMPER DEVICE FOR A BICYCLE

(75) Inventors: Meng Tsung Chen, Taichung (TW); Andreas Felsl, Biel (CH)

(73) Assignee: B-Labs AG, Biel (CH)

(*) Notice: Subject to any disclaimer, the term of this patent is extended or adjusted under 35 U.S.C. 154(b) by 13 days.

(21) Appl. No.: 13/599,422

(22) Filed: Aug. 30, 2012

(65) Prior Publication Data
US 2013/0105260 A1 May 2, 2013

(30) Foreign Application Priority Data
Aug. 30, 2011 (DE) .......................... 10 2011 053 127

(51) Int. Cl.
| | |
|---|---|
| *F16F 9/512* | (2006.01) |
| *F16F 9/02* | (2006.01) |
| *F16F 9/44* | (2006.01) |
| *F16F 9/34* | (2006.01) |
| *F16F 9/46* | (2006.01) |
| *B62K 25/10* | (2006.01) |
| *F16F 9/348* | (2006.01) |
| *B62K 25/04* | (2006.01) |

(52) U.S. Cl.
CPC .................. *F16F 9/512* (2013.01); *B62K 25/10* (2013.01); *F16F 9/0209* (2013.01); *F16F 9/3405* (2013.01); *F16F 9/348* (2013.01); *F16F 9/44* (2013.01); *F16F 9/46* (2013.01); *F16F 9/461* (2013.01); *F16F 9/466* (2013.01); *F16F 9/469* (2013.01); *B62K 2025/047* (2013.01)

(58) Field of Classification Search
CPC ........... F16F 9/44; F16F 9/3485; F16F 9/461; F16F 9/466; F16F 9/512; F16F 9/3405; F16F 9/0209

USPC ......... 188/313, 287, 275, 278, 280, 285, 314, 188/322.13, 319.1, 281, 322.15
See application file for complete search history.

(56) References Cited

U.S. PATENT DOCUMENTS

| | | | | |
|---|---|---|---|---|
| 4,997,068 A | * | 3/1991 | Ashiba | .................... F16F 9/468 188/266.4 |
| 5,293,971 A | * | 3/1994 | Kanari | .................... F16F 9/468 188/282.1 |

(Continued)

FOREIGN PATENT DOCUMENTS

| | | |
|---|---|---|
| EP | 2112401 | 10/2009 |
| JP | H02217637 | 8/1990 |

(Continued)

OTHER PUBLICATIONS

EP Search Report of corresponding priority application, dated May 9, 2014.

*Primary Examiner* — Anna Momper
*Assistant Examiner* — San Aung
(74) *Attorney, Agent, or Firm* — Boyle Fredrickson S.C.

(57) ABSTRACT

A suspension damper device comprising a housing adapted to be affixed, on which a suspension means may be supported which may be tensed in a direction of suspension via a damper body of a damping means adapted to be connected to a component to be dampened, wherein in the damper body a damper piston fixedly connected to the housing is guided which physically separates two damper spaces in the damper body, characterized in that three valves are provided whereby a volume flow of a fluid between the damping spaces may be controlled in particular during tensing of the suspension means in the direction of suspension.

10 Claims, 7 Drawing Sheets

(56) References Cited

U.S. PATENT DOCUMENTS

| | | | | |
|---|---|---|---|---|
| 5,566,796 | A * | 10/1996 | De Kock | F16F 9/3214 |
| | | | | 188/282.1 |
| 5,823,306 | A * | 10/1998 | de Molina | F16F 9/516 |
| | | | | 188/282.5 |
| 6,279,703 | B1 | 8/2001 | Mete | |
| 6,360,857 | B1 * | 3/2002 | Fox | F16F 9/3485 |
| | | | | 188/281 |
| 6,491,146 | B1 * | 12/2002 | Yi | B62K 25/04 |
| | | | | 188/319.2 |
| 7,147,207 | B2 * | 12/2006 | Jordan | F16F 9/461 |
| | | | | 188/322.22 |
| 2003/0234144 | A1 * | 12/2003 | Fox | B62K 25/04 |
| | | | | 188/278 |
| 2005/0056505 | A1 * | 3/2005 | Deferme | F16F 9/3485 |
| | | | | 188/322.15 |
| 2005/0077131 | A1 | 4/2005 | Russell | |
| 2008/0314704 | A1 * | 12/2008 | Deferme | F16F 9/3481 |
| | | | | 188/266 |
| 2009/0000887 | A1 * | 1/2009 | McAndrews | F16F 9/504 |
| | | | | 188/275 |
| 2010/0044975 | A1 * | 2/2010 | Yablon | B60G 11/27 |
| | | | | 280/5.503 |
| 2011/0174582 | A1 * | 7/2011 | Wootten | F16F 9/461 |
| | | | | 188/266 |
| 2012/0247893 | A1 * | 10/2012 | Gonzalez | F16F 9/3242 |
| | | | | 188/313 |

FOREIGN PATENT DOCUMENTS

| | | |
|---|---|---|
| JP | H02275128 | 11/1990 |
| JP | H02278026 | 11/1990 |
| JP | 2006010069 | 1/2006 |

* cited by examiner

SUSPENSION DAMPER DEVICE FOR A BICYCLE

CROSS-REFERENCE TO RELATED APPLICATION

This application claims priority to German Patent Application No. DE 10 2011 053 127.0 filed on Aug. 30, 2011, which is expressly incorporated herein by reference.

BACKGROUND OF THE INVENTION

1. Field of the Invention

The invention relates to a suspension damper device for a bicycle, including a housing adapted to be affixed, on which a suspension means is supported, the suspension means being tensed in a direction of suspension via a damper body of a damping means.

2. Description of the Related Art

From the prior art a variety of suspension damper devices for bicycles are known. For the suspension of a rear swing arm of a bicycle a suspension means is customarily provided which is a pneumatic or steel suspension means in order to absorb impact forces of the rear swing arm occurring during use of the bicycle. In order to control the suspension, in particular to dampen it, a damping means is generally provided.

U.S. Pat. No. 6,360,857 B1 discloses a like suspension damper device. It has a housing which is adapted to be affixed to a bicycle frame and on which an air cylinder is arranged. In this air cylinder, and coaxially with it, a guide rod is arranged which is fixedly connected to the housing and on which a gas piston is slidingly guided in the air cylinder while separating a first air space from a second air space inside the air cylinder. The gas piston is connected to a tubular damper body which in turn is connected by its end portion facing away from the air cylinder to a rear swing arm to be dampened of a bicycle and is displaceable, together with the gas piston, approximately coaxially with the guide rod. Inside the damper body a damper piston is arranged which is fixedly connected to the guide rod and separates a cylinder from an annular space inside the damper body. When the suspension damper device is subjected to an impact, the gas piston is displaced toward the housing via the damper piston, with the gas piston thus reducing an air space delimited by it inside the air cylinder, whereby the impact is cushioned. At the same time the damper body is displaced relative to the damper piston which is fixedly connected to the guide rod, wherein a pressure in the cylinder space is increased. In order to enable a relative displacement between the damper body and the damper piston, two valves are formed inside the damper piston which open starting from a defined pressure difference between the cylinder space and the annular space of the damper body, to thus enable a fluid communication between the cylinder space and the annular space. The first valve of the suspension damper device as a rule opens at comparatively low compression velocities and thus at comparatively low pressure differences in the damper body. From a particular compression velocity the second valve then opens as a kind of overload protection in order to avoid excessively high pressure differences between the cylinder space and the annular space of the damper body.

Here it is a drawback that even at comparatively low pressure differences, bottoming of the suspension damper device may take place, i.e., the gas piston impacts on the housing, which may result in damages. If the valve only opens at comparatively high pressure differences, on the other hand, bottoming will generally be avoided but this may bring about extremely high pressure forces in the damping means, which may also result in damages. In the latter case it is a further drawback that the suspension of the bicycle, in particular the rear swing arm, exhibits a very coarse responsiveness at higher velocities, which may result in loss of traction.

In contrast, the invention is based on the object of providing a suspension damper device which overcomes the named drawbacks.

This object is achieved through a suspension damper device in accordance with the features of claim 1. Further advantageous developments of the invention are subject matter of further subclaims.

In accordance with the invention, a suspension damper device for a bicycle comprises a housing, in particular a housing which is adapted to be affixed to a bicycle frame. On this housing a suspension means may be supported, with this suspension means in particular being a pneumatic suspension means and/or a steel suspension means. The suspension means is adapted to be tensed via a damper body of a damping means in a suspension direction. The damper body is connected to a component to be dampened, for instance a rear swing arm of the bicycle. A damper piston which is affixed to the housing, in particular via a guide rod, is slidingly guided inside the damper body. The damper piston divides the damper body into two damper spaces. For the purpose of damping a suspension of the suspension means by means of the damping means, the latter comprises three valves which are in particular pressure control valves. Through these valves a volume flow of a fluid between the damper spaces may be controlled during tensing of the suspension means in the suspension direction, whereby damping forces of the damping means are in turn controlled. This solution presents the advantage that the valves may open in the presence of different pressure differences between the damper spaces, thus enabling a better adjustment of desired damping forces of the damping device in comparison with the prior art having only two valves. In the event of an impact which is cushioned by the suspension damper device, a valve may then open at low impact velocities, i.e., a low displacement velocity of the damper body, and thus at comparatively low pressure differences between the damper spaces, while the second valve may additionally open at more intense impacts or higher displacement velocities of the damper body, and thus at greater pressure differences. The third valve may then serve as an overload protection and may be opened in addition to the other two valves in the event of very intense impacts and thus very high displacement velocities of the damper body. The second valve thus in particular controls medium and fast displacement movements of the damper body. An opening cross-section of the second valve may be smaller than in the prior art because the third valve additionally opens at extremely high velocities of the damper body in order to allow a high volume flow between the damper spaces so as to decrease the pressure load. As the two valves thus each clear a smaller flow cross-section than in the prior art and only jointly clear a flow cross-section comparable to the prior art, they are each capable of closing comparatively rapidly at the end of the displacement movement of the damper body, with a thrust reversal of the suspension damper device thus taking place extremely quickly.

In a further aspect of the invention the damper piston is arranged on a guide rod which is fastened to the housing, with the damper piston then separating a cylinder space from an annular space inside the damper body, and the valves each control a volume flow of the fluid into the damper body which flows through the damper piston.

In a preferred manner the valves control the volume flow of the fluid during a movement of the damper body in the direction of suspension of the suspension means, i.e., while the suspension means is being tensed. The valves open at different pressure differences between the annular space and the cylinder space. When the pressure again drops below a predetermined pressure difference of a valve, the respective valve closes.

In a preferred manner the first valve comprises an annular valve body which is guided along the guide rod and is tensed via a valve spring against an end face of the damper piston. At a particular pressure difference between the cylinder space and the annular space of the damper body, the valve body is displaced by a pressure of the fluid into an open position away from the damper piston against the resilient force of the valve slides, with the valve body clearing a first connection recess between the cylinder space and the annular space provided in the damper piston. The valve spring is preferably affixed to the guide rod. Such a valve is extremely simple and cost-efficient in terms of construction.

Advantageously the second valve comprises a spring washer which is encompassed by the valve body of the first valve affixed to the guide rod. This spring washer contacts the end face of the damper piston, particularly in the closed condition, and owing to pressure forces of the fluid in the damper body is elastically deformed at a defined pressure difference between the cylinder and annular spaces along sections in a direction away from the damper piston while clearing a second connection recess between the cylinder space and the annular space which is provided in the damper piston. This also is a valve having an extremely simple and cost-efficient construction.

In a preferred manner a guide ring, in particular a hollow-cylindrical guide ring, for guiding the valve body of the first valve is provided, which is affixed to the guide rod. It contacts the damper piston and has a through opening which is in fluid connection with the second connection recess controlled by the second valve. The spring washer of the second valve contacts the guide ring in the closed condition and via the latter controls the second connection recess of the damper piston and the through opening of the guide ring connected to the damper piston. Owing to the guide ring, the first and the second valve may thus be arranged adjacent each other in an extremely compact and space-saving manner.

In a further aspect of the invention, the third valve is a control valve for controlling a flow path of the fluid from the cylinder space to the annular space, wherein the flow path is in particular adapted to be opened and closed.

The pressure forces at which the first or second valve open may be adjusted in a simple manner by altering the number of spring washers allocated to each of them. In addition, or as an alternative, it is also possible to employ spring washers having different mechanical properties, for example having a different elasticity.

In order to ensure a spacing of the spring washers of the first and the second valve, the annular valve body of the first valve advantageously comprises a support shoulder extending away from the damper piston via which the spring washer allocated to it is then supported.

In order to enable a flow of fluid from the cylinder space to the annular space in the opened condition of the second valve, at least one through opening is provided in the support shoulder of the annular valve body of the first valve.

In order to increase a volume flow between the cylinder space and the annular space in the opened condition of the first and the second valve, at least one flow recess is provided between an outer jacket surface of the guide ring and an inner jacket surface of the annular valve body of the first valve. This flow recess may simply be executed as a longitudinal groove in the inner jacket surface of the annular valve body.

In accordance with the invention, a suspension damper device comprises a housing which is adapted to be affixed and against which a suspension means may be supported. The latter may be tensed via a damper body of a damping means that is adapted to be connected to a component to be dampened. The damper body comprises a damper piston which is adapted to be affixed to the housing while physically separating two damper spaces inside the latter. Through the intermediary of a valve a fluid connection between the damper spaces may be controlled, with the valve being adapted to be opened and closed via a lever which is arranged on the housing and may be pivoted relative to the housing. Advantageously the valve is opened fully when the lever extends about in parallel with a longitudinal direction of the suspension damper device.

This solution has the advantage that an operator of the lever, such as a rider of a bicycle equipped with the suspension damper device, may clearly ascertain whether the valve is opened fully. In the prior art, on the other hand, such a lever has an oblique arrangement relative to the longitudinal direction of the suspension damper device both in the opened condition of a valve and in a closed condition of a valve, so that it may be difficult for an operator of the lever to know whether the valve to be controlled by the lever is presently opened or closed.

In a preferred manner the damper piston is affixed to the housing via a guide rod while separating an annular space penetrated by the guide rod from a cylinder space inside the damper body, wherein a volume flow of a fluid from the cylinder space in a direction toward the annular space of the damper piston may be controlled by means of the lever.

In accordance with the invention, a suspension damper device for a bicycle comprises a housing which is adapted to be affixed and on which a suspension tube of a pneumatic suspension means is fixedly arranged. Inside the suspension tube a gas piston is guided for pneumatic suspension, which is adapted to be displaced in the suspension tube via a damper body of a damping means which is adapted to be connected to a component to be dampened such as, e.g., a rear swing arm. For the pneumatic suspension the gas piston jointly with the suspension tube defines an air space, wherein advantageously a volume of the air space is determined by the size of a spacer which is adapted to be affixed to the housing and is arranged inside the air space. This allows to vary the volume of the air space by way of the size of the employed spacer during assembly. In the prior art, on the other hand, the size of the air space is disadvantageously determined through differently dimensioned suspension tubes. In order to save space, the spacers may be executed to be hollow or of closed-cell plastic. With the aid of the spacer a cushioning characteristic line of the suspension damper device may thus be adapted in a simple manner to desired conditions of use of the suspension damper device.

BRIEF DESCRIPTION OF THE DRAWINGS

In the following the invention shall be explained in further detail by referring to schematic drawings, wherein.

DETAILED DESCRIPTION OF THE PREFERRED EMBODIMENTS

Figure 1:
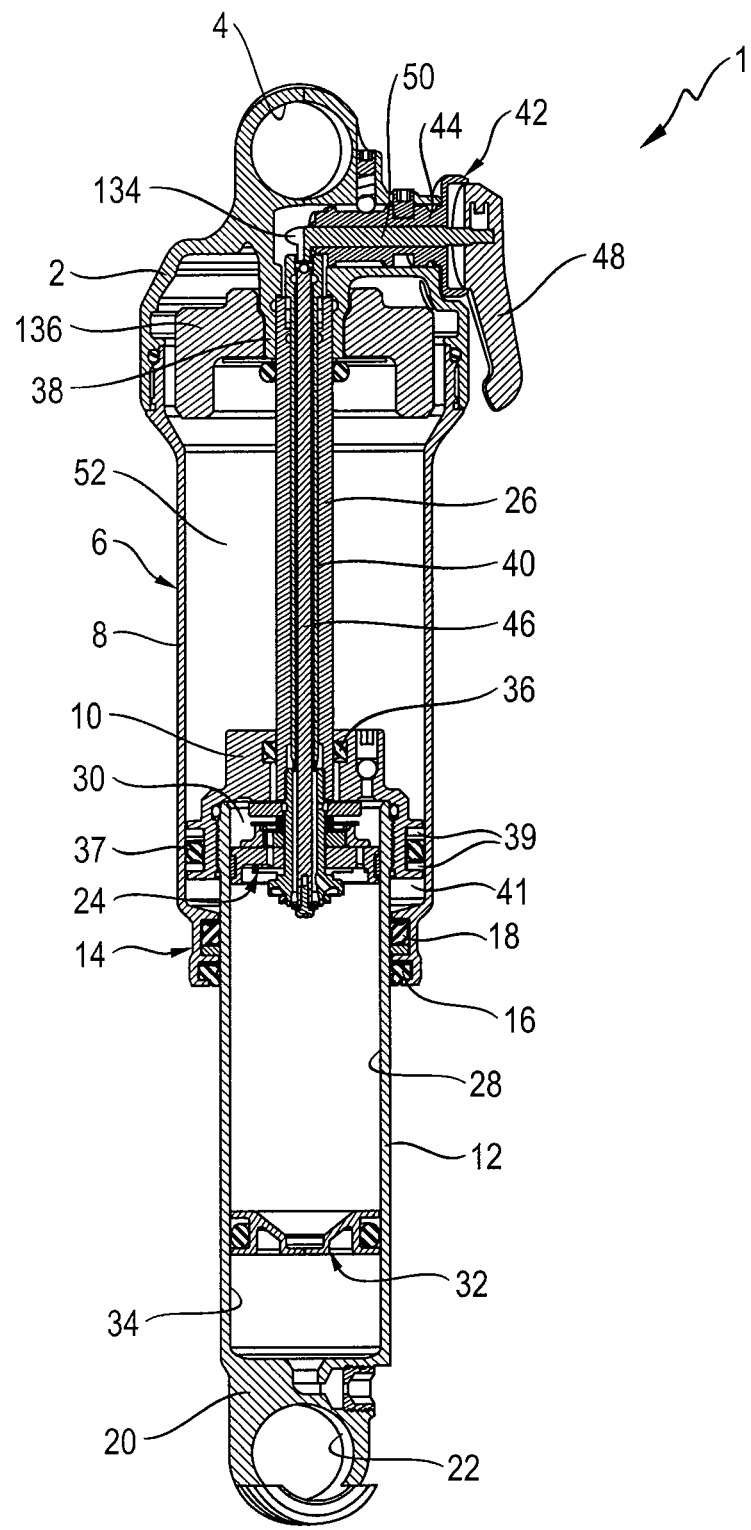
FIG. 1 shows a suspension damper device according to a practical example in a schematic longitudinal sectional view.

In FIG. 1 a suspension damper device 1 according to a practical example is represented schematically in a longitudinal sectional view. It serves for the suspension of a rear swing arm of a bicycle, in particular a mountain bike. The device 1 has a housing 2 having formed thereon a lug 4 whereby it may be bonded to a bicycle frame of a bicycle, in particular a frame tube. The housing 2 is thus fastened through the lug 4 at the bicycle frame so as to still be pivotable within a plane of the frame. The housing 2 is realized as a cylinder bottom of a substantially tubular air cylinder 6. The air cylinder 6 comprises an air-filled suspension tube 8 having at its end portion facing the housing 2 an external thread whereby it may be sealingly screwed into a corresponding internal thread in the housing 2. In the suspension tube 8 a gas piston 10 fixedly connected to a damper body 12 is arranged so as to be axially displaceable. The damper body 12 having a substantially hollow-cylindrical shape is screwed by its end portion facing the housing 2 into an internal recess of the gas piston 10 and thus fixedly connected to the latter. The damper body 12 penetrates an end portion of the suspension tube 8 which faces away from the housing 2 and is executed as a guide bush 14 for the suspension damper body 12. The guide bush 14 of the suspension tube 8 comprises a stripping ring 16 and a seal ring 18. The damper body 12 comprises an enclosed end portion 20 which faces away from the housing 2 and has a lug 22 whereby the suspension damper device 1 is connected to a rear swing arm to be dampened of the bicycle. Here, too, the connection is executed such that the suspension damper device 1 may be pivoted via the lug 22 within a plane of the frame. For the purpose of dampening a suspension, a damper piston 24 is arranged in the hollow-cylindrical damper body. This damper piston is fastened via a guide rod 26 extending through the suspension tube 8, the gas piston 10, and portions of the damper body 12, with said guide rod in turn being affixed to the housing 2 or to the cylinder bottom by its end portion facing away from the damper piston 24. Inside the damper body 12 the damper piston 24 separates a cylinder space 28 from an annular space 30 through which the guide rod 26 extends. Inside the damper body 12 there is moreover arranged a separating piston 32 which is displaceable in the longitudinal direction and separates the cylinder space 28 from a compensation space 34. The latter serves for compensation of the volume when the guide rod 26 plunges into the damper body 12 while the latter performs a translation toward the housing 2.

The gas piston 10 is slidingly guided on the guide rod 26 via an annular seal 36 which also serves to seal the damper piston 24 against the suspension tube 8. Moreover the gas piston 10 is guided within the suspension tube 8 via a seal ring 37 and two slide rings 39 arranged adjacent the latter. The gas piston 10 separates an annular space 52 which is penetrated by the guide rod 26 from an annular space 41 of the air cylinder 6 which is penetrated by the damper body 12. As was mentioned at the outset, the manner of functioning of this gas piston 10 is analogous to that of the prior art. By way of example several valves are formed inside the damper body 12 in the area of the damper piston 24 for controlling a volume flow of a fluid between the cylinder space 28 and the annular space 30 of the damper body 12; this will be explained below in further detail in the following figures.

The guide rod 26 has a tubular shape and is sealingly screwed into an axial protrusion 38 of the housing 2 by its end portion. In the guide rod 26 a tubular return phase valve body 40 is inserted whereby an opening cross-section of a valve may be controlled in the area of the damper piston 24 in that the latter is adjustable in an axial direction relative to the guide rod 26 by means of a rebound or return phase adjustment device 42. The latter has a rotary knob which is inserted radially in the housing relative to the longitudinal direction thereof, and whose end portion cooperates with the end portion of the return phase valve body 40. In the tubular return phase valve body 40 a pin-shaped compression valve body 46 is furthermore inserted in an axially displaceable manner, whereby an opening cross-section of a valve may be adjusted in the area of the damper piston 24 (opening cross-section); this shall also be explained in more detail further below. In order to adjust the opening cross-section, the valve body 46 is displaced in an axial direction, which is effected with the aid of a lever 48. The lever 48 is arranged on a lever axle 50 which axially extends through the rotary knob 44 and cooperates with the valve body 46 by its end portion facing away from the lever 48.

Figure 2:
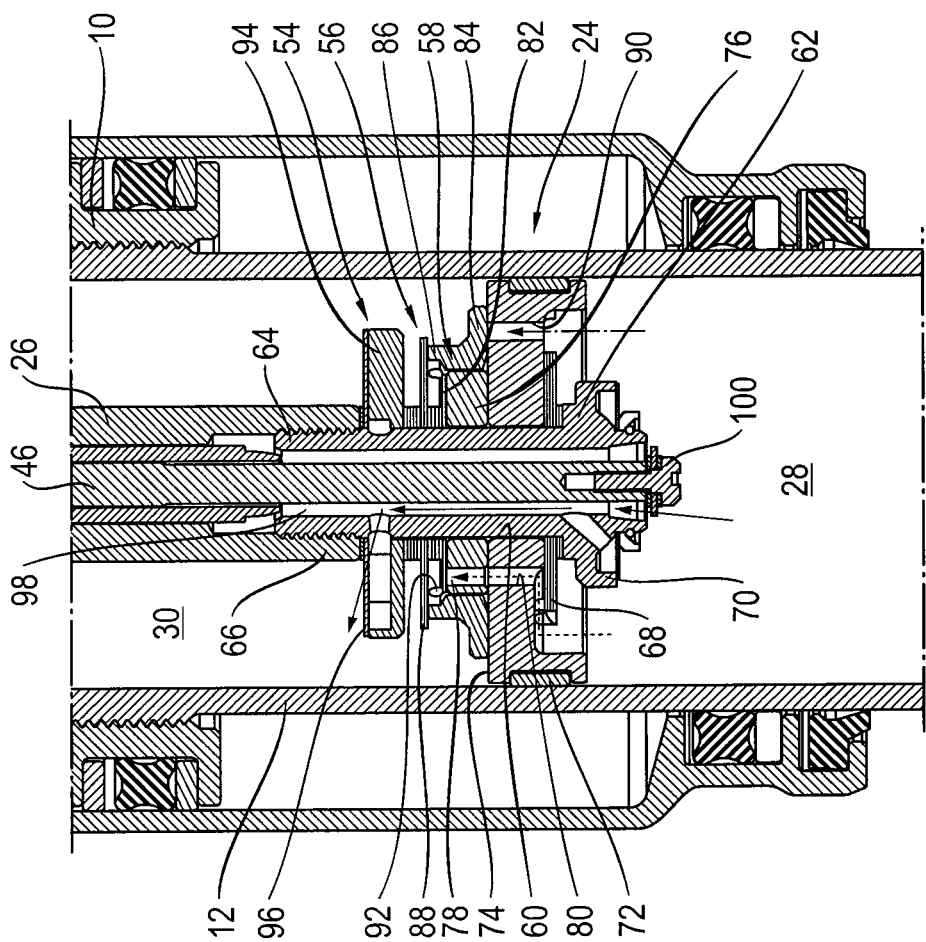
FIG. 2 shows an enlarged detail of the suspension damper device of FIG. 1.

The valves in the area of the damper piston 24 are explained in more detail by referring to FIG. 2.

FIG. 2 shows a detail of the suspension damper device 1 of FIG. 1 in the area of the damper piston 24. In this view the gas piston 10 is displaced, jointly with the damper body 12, in the direction of the housing 2 of FIG. 1. The displacement comes about due to an impact force of the rear-wheel axle which is transmitted via the lug 22 in FIG. 1 to the damper body 12 and via the latter to the gas piston 10, with the gas piston 10 together with the damper body 12 accordingly moving in a direction of reducing an air-filled annular space 52 of the air cylinder 6 of FIG. 1 so as to cushion this impact force by a pneumatic suspension. For the purpose of damping this pneumatic suspension, the damper piston 24 of FIG. 2 is provided with three valves 54, 56 and 58 which control a volume flow of a fluid from the cylinder space 28 to the annular space 30 of the damper piston 24.

The damper piston 24 has a pot-type shape and includes a central cylindrical recess 60. By this recess the damper piston 24 is placed on a T-shaped valve piece 62 which is screwed by its end portion facing the housing 2 of FIG. 1 into an end portion 66 of the guide rod 26 facing away from the housing 2. The damper piston 24 is placed on a longitudinal leg of the T-shaped valve piece 62 and spaced apart from a transverse leg 70 of the T-shaped valve piece 62 via a plurality of washers 68. The concave inner area of the damper piston 24 faces away from the housing 2 of FIG. 1. At its outer circumference the damper piston 24 has a piston ring 72. An end face 74 of the damper piston 24 facing away from the transverse leg 70 of the T-shaped valve piece 62 is executed to be substantially planar. On it there is placed an approximately hollow-cylindrical guide ring 76 which has a circular-cylindrical inner recess having a diameter that approximately corresponds to the diameter of the recess 60 of the damper body 12 and via which the guide ring 76 is arranged on the valve piece 62 by encompassing the guide piece 62. The guide ring 76 has three axially extended through openings, one through opening 78 of which is represented in FIG. 2. These have an approximately coaxial arrangement with a respective through opening of the damper piston 24, only one through opening 80 of which is represented in FIG. 2. The through openings 78 and 80 serve for passing through a volume flow of the fluid from the cylinder space 28 to the annular space 30. For the purpose of controlling this volume flow, the valve 58 is provided which has a washer or spring washer 82 having about a same diameter as the guide ring 76 and contacting its end face facing away from the damper piston 24. A through opening of the spring washer 82 is formed in correspondence to the recess 60 of the damper piston 24, whereby the spring washer 82 is placed and fixed on the valve piece 62. Via the through bores 78, 80 the spring washer 82 is subjected to pressure from the cylinder space 28, and on its side facing away from the damper piston 24 to the pressure of the annular space 30. At a defined pressure difference between the cylinder space 28 and the annular space 30 the spring washer 82 is elastically bent away from the guide ring 76, thus enabling a volume flow of the fluid to flow from the annular space 28 to the cylinder space 30. The valve 56 has an annular valve body 84 which is guided by its inner jacket surface on an outer jacket surface of the guide ring 76 in an axially displaceable manner. In the closed condition it substantially contacts the end face 74 of the damper piston 24 by a valve surface facing toward the damper piston 24. The annular valve body 84 is prolonged in the axial direction by an annular support shoulder 86 and jointly with the latter has a greater width than the guide ring 76 when viewed in the longitudinal direction. Via the support shoulder 86 the annular valve body 84 is supported against two spring washers 88 which are arranged above each other and have a greater diameter than the spring washer arranged at the guide ring 76. In the closed condition of FIG. 2, the valve body 84 of the valve 56 blocks a through bore 88 of the damper piston 24, with the through bore 90 being situated further outside than the through opening 80 in a radial view. Through the through bore 90 the valve body 84 is thus subjected to a pressure of the fluid in the cylinder space 28, wherein the valve body 84 is axially displaced in a direction away from the damper piston 24 starting from a defined pressure difference between the cylinder space 28 and the annular space 30, so that the spring washers 88 are elastically bent and tensed. Once a particular pressure difference between the cylinder space 28 and the annular space 30 drops, the spring washers 88 are relaxed, so that the annular valve body 84 of the valve 56 is axially displaced back to the damper piston 24 and closes the through bore 90.

The spring washers 88 are spaced apart from the spring washer 82 via several washers having a substantially smaller diameter than the spring washer 82. Radial recesses 92 are moreover provided in the valve body 84 in the area of the support shoulder 86, thus enabling fluid to flow via the through opening 78 of the guide ring 76 and the radial recess 92 to the annular space 30 in the opened condition of the valve 58.

The valve 54 is arranged on the valve piece 62 while being spaced apart from the spring washers 88 via several washers. This valve piece has a pot-shaped valve part 94 whose concave side faces away from the damper piston 24. The valve part 94 is placed on the valve piece 62 via a cylindrical recess. The concave side of the valve part 94 is closed by a spring washer 96 having a diameter which is somewhat larger than the diameter of the spring washers 88 of the valve 56. The spring washer is equally arranged on the valve piece 62. A radial bore of the valve piece 62 which is connected to an axial through bore 98 of the valve piece 62 opens into the concave inner space of the valve part 94 of the valve 54. Through the through bore 98 of the valve piece 62 the compression valve body 46 is passed which has a smaller outer diameter than the through bore 98, thus resulting in the formation of a ring passage between the through bore 98 and the compression valve body 46 which establishes a fluid connection of the concave inner space of the valve part 94 with the cylinder space 28. The spring washer 96 of the valve 54 is thus subjected to pressure from the cylinder space 28 via the annular space of the valve piece 62, the radial through bore, and the concave inner space of the valve part 94. Starting from a particular pressure difference between the cylinder space 28 and the annular space 30 the spring washer 96 is elastically bent away from the valve part 94, so that an opening cross-section for a volume flow of the fluid between the cylinder space 28 and the annular space 30 is cleared. On the spring washer 96 a further washer is arranged which contacts an annular end face of the guide rod 26.

The valve piece 62 thus serves to affix an assembly consisting of the damper piston 24, the guide ring 76, the spring washer 82, the spring washers 88, the valve body 84, the valve part 94, and the spring washer 96 to the guide rod 26. The valves 54, 56 and 58 accordingly form an assembly having an extremely compact and simple construction.

The volume flow flowing to the valve 54 through the valve piece 62 is adjustable with the aid of the compression valve body 46. To this end, the latter may be displaced in an axial direction by means of the lever 48, see FIG. 1, whereby an opening cross-section between an end portion 100 of the compression valve body 46 facing away from the housing 2 of FIG. 1 and the through bore 98 of the valve piece 62 may be adjusted. The adjustment options are explained in more detail in the description further below.

In the following, reference is made to FIG. 2 for explaining the function of the suspension damper device 1 of FIG. 1 during a compression phase in which the damping means acts as a compression dampening. It shall be assumed that the end portion 100 is arranged in its open position.

In the following there will be differentiated between compression of the suspension damping means 1 in a slow, a medium, and a fast velocity range. In the slow velocity range, i.e., in the event of less severe impacts of the rear-wheel suspension, the gas piston 10 of FIG. 1 is displaced comparatively slowly in the direction of the annular space 52 being reduced in size. Concurrently the damper body 12 is displaced relative to the damper piston 24, so that the cylinder space 28 of the damper body 12 is also reduced in size. The pressure of the fluid in this cylinder space 28 rises accordingly, while the pressure in the annular space 30 of the damper body 12 decreases. Owing to the pressure difference a pressure force acts on the valves 54, 56 and 58 in their opening direction. Here the opening forces are adjusted such that the valve 54 opens first. At low velocities the spring washer 96 of the valve 54 thus opens a fluid connection between the cylinder space 28 and the annular space 30, so that a volume flow can flow via this valve 54 for a pressure compensation.

In the range of medium compression velocities the pressure difference between the cylinder space 28 and the annular space 30 increases further, with the valve 56 then opening in addition to the valve 54 in that the valve body 84 is displaced axially. In this medium velocity range both valves 54 and 56 are thus opened so that a greater volume flow may flow between the cylinder space 28 and the annular space 30, with the forces acting on the suspension damper device 1 being reduced accordingly.

The function of avoiding high loads on the suspension damper device 1 in the area of high velocities, in particular in the event of severe impacts on the rear-wheel suspension, is served by the valve 58 which opens in addition to the valves 54 and 56 when a particular pressure difference between the cylinder space 28 and the annular space 30 is exceeded.

Hereby an opening cross-section for a volume flow between the cylinder space 28 and the annular space 30 is increased further, so that the load acting on the suspension damper device 1 is reduced.

Figure 3:
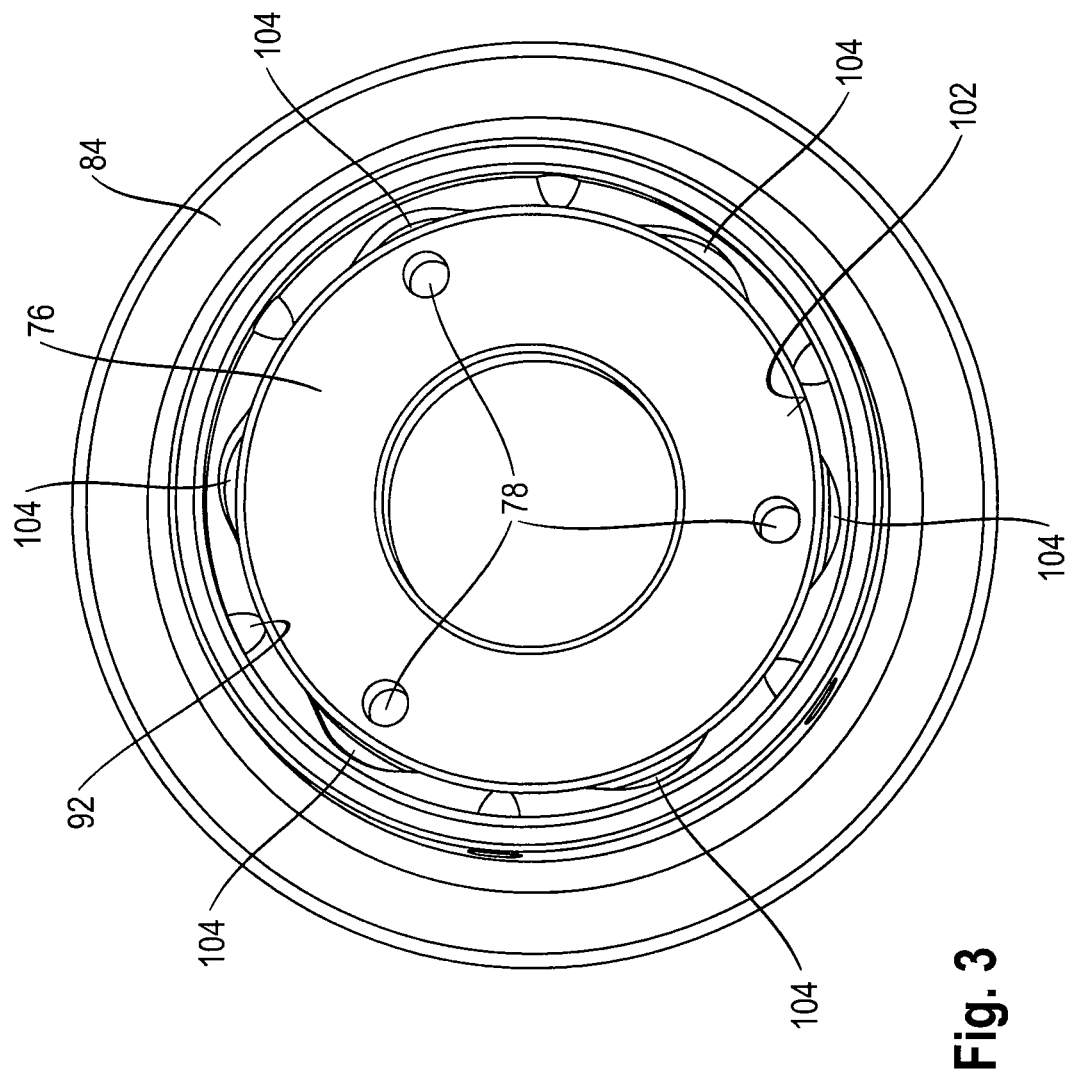
FIG. 3 shows an enlarged detail of the suspension damper device of FIG. 1.

FIG. 3 shows the guide ring 76 together with the valve body 84 in a perspective representation. What is visible here are the three through openings 78 with the guide ring 76 which are distributed regularly on a common partial circle. In FIG. 3 six radial recesses 92 of the valve body 84 are moreover visible which are also distributed regularly on a common partial circle. In addition to the radial recesses 92, six longitudinal grooves 104 are provided in a inner jacket surface 102 whereby a flow cross-section of the fluid flowing via the through openings 78 and 80, see FIG. 2, is enlarged in the opened condition of valve 58 and valve 56.

Figure 4:
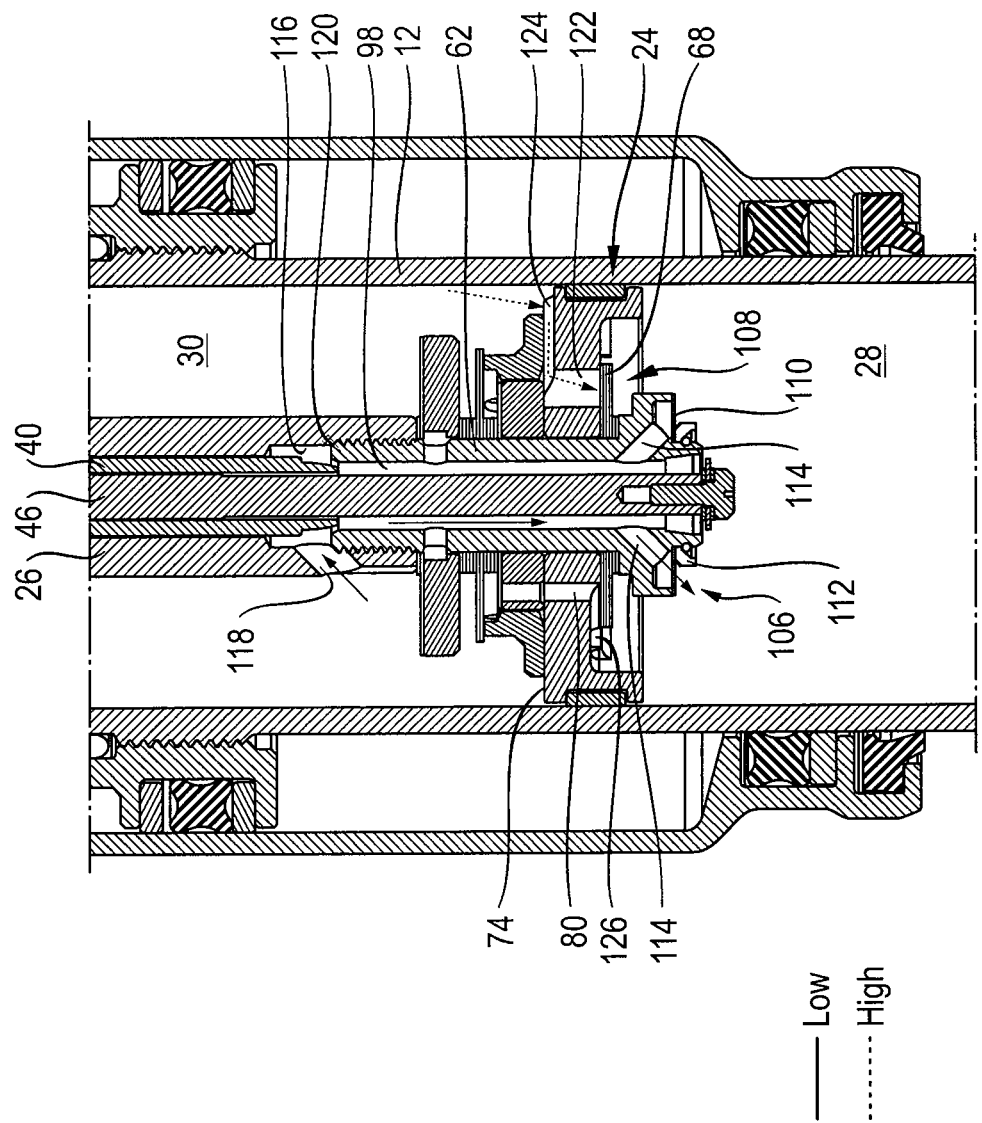
FIG. 4 shows an enlarged detail of the suspension damper device of FIG. 1.

In FIG. 4 an enlarged detail of the suspension damper device 1 of FIG. 1 in the area of the damper piston 24 is represented. FIG. 4 serves to explain the return phase damping of the suspension damper device 1 in which the pneumatic suspension means including the air cylinder 6 is relaxed. In this phase the gas piston 10 is moved in the direction of an enlarging annular space 52, so that the damper piston 24 is displaced relative to the damper body 12 in the direction of a diminishing annular space 30 of the damper body 12. As a result the pressure in the annular space 30 increases in comparison with the cylinder space 28, so that a fluid may flow from the annular space 30 via a valve 106 and 108 for pressure compensation.

The valve 106 includes a spring washer 110 affixed to the valve piece 62. It is placed on an axial protrusion of the valve piece 62 which faces away from the damper piston 24 and is fixed by a nut 112 screwed onto the axial protrusion. In the closed condition the spring washer 110 closes oblique bores provided in the transverse leg 114 of the valve piece 62 and opening into the axial through bore 98 thereof. The through bore 98 of the valve piece 62 opens into an annular space 116 of the guide rod 26. The annular space is here delimited by an end face of the valve piece 62 and is in fluid communication with the annular space 30 of the damper body 12 via an oblique bore 118 provided in the guide rod 26. An inner chamfer of the valve piece 62 facing toward the annular space 116 serves as a valve seat 120 for the return phase valve body 40 whereby an opening cross-section between the annular space 116 and the through bore 98 may be adjusted with the aid of the adjusting device 42 of FIG. 1. This is the adjustment of the so-called "return phase."

The valve 108 consists of the washers 68 of FIG. 2 used as spring washers 68. In the closed condition the spring washers, of which there are altogether four, contact an inner bottom surface of the damper piston 24 so as to close a through opening 122 which is provided axially in the damper piston 24 and opens into the area between the guide ring 76 and the valve body 84 of FIG. 2 at the end face 74 of the damper piston 24. Via a radial groove 124 provided in the end face 74 the through opening 122 is in fluid communication with the annular space 30. In order for the spring washers 68 not to close the through opening 80 for the valve 58 of FIG. 2, the latter is also connected via a radial groove 126 which is provided in the bottom surface of the damper piston 24 facing away from the end face 74. Starting from a defined pressure difference between the annular space 30 and the cylinder space 28, the valves 106 and 108 open in that their spring washers 110 and 68 are elastically bent toward the cylinder space 28. The valves 54, 56, and 58 of FIG. 2 are closed due to the higher pressure in the annular space 30. When the compression valve body 46 is in an open position, the fluid may furthermore flow via its cleared through opening in addition to the oblique bores 114.

Figure 5:
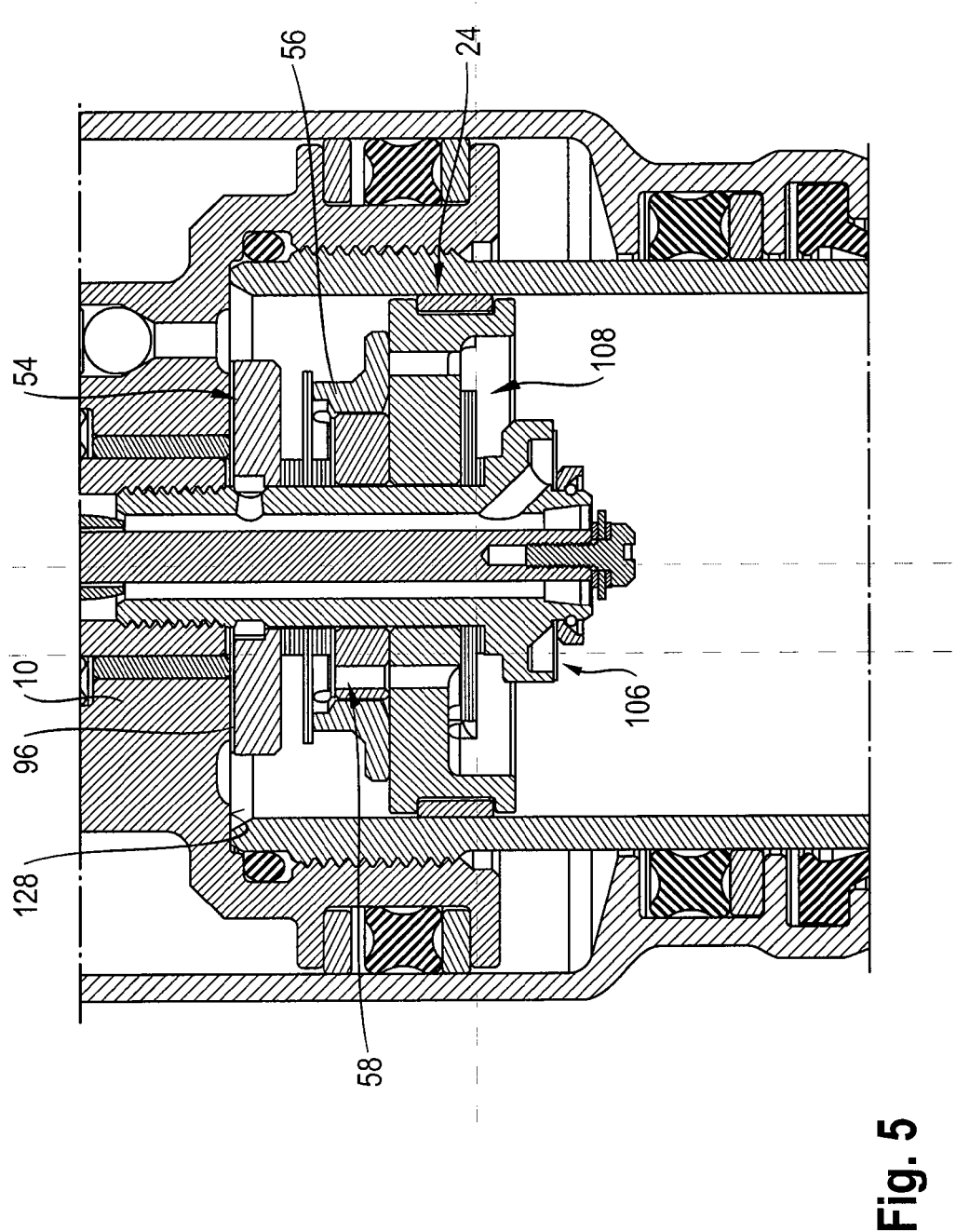
FIG. 5 is a perspective representation of elements of the suspension damper device of FIG. 1.
Figure 6:
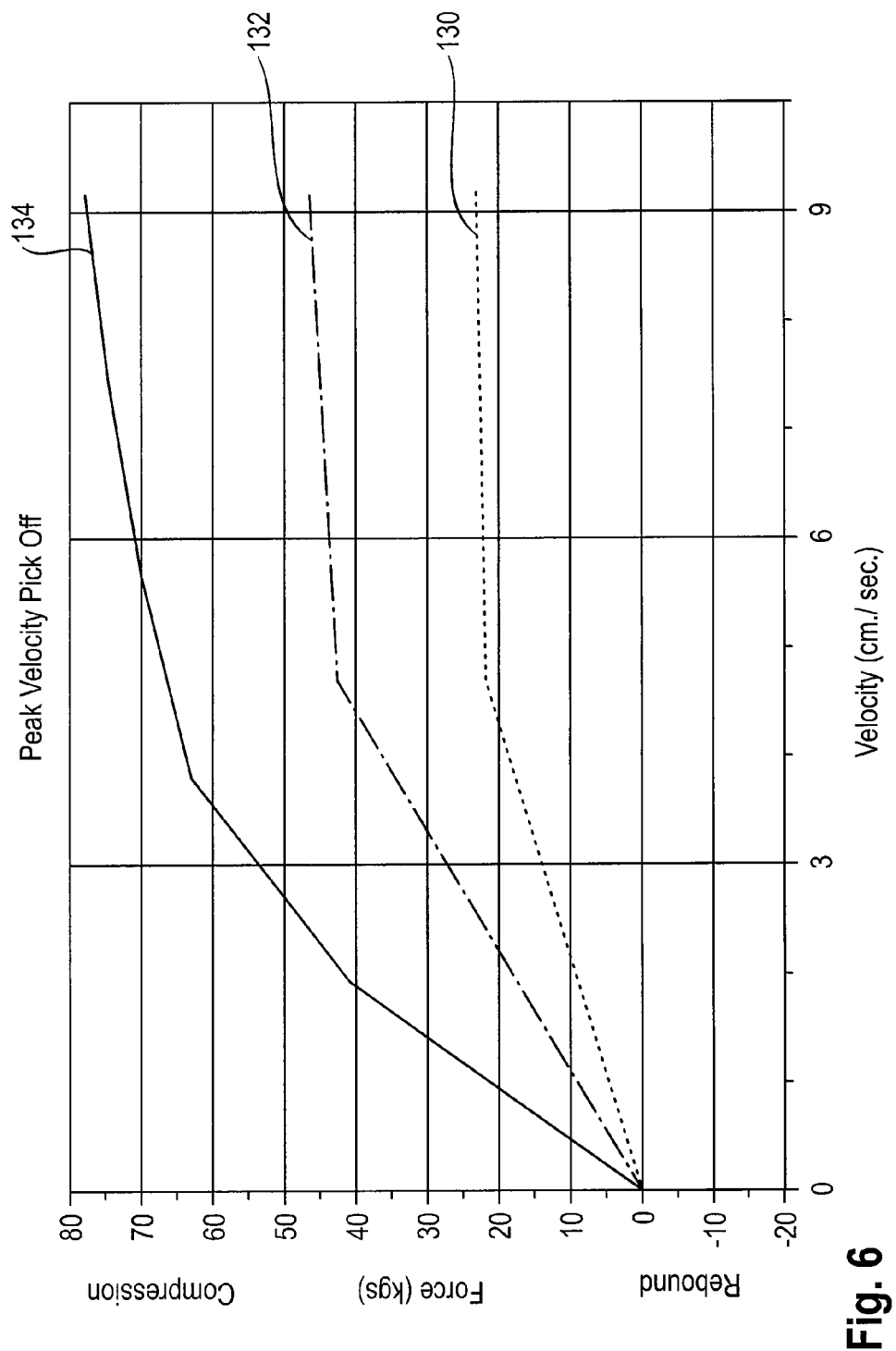
FIG. 6 is a diagram showing several velocity/damping force characteristic lines.

FIG. 5 shows an enlarged detail of the suspension damper device 1 of FIG. 1 in the area of the damper piston 24. Here a rest condition of the suspension damper device 1 is represented. The valve 54 contacts an inner bottom surface 128 of the gas piston 10 by its spring washer 96. In order to adjust the differential pressure at which the valves 54, 56, 58, 106 and 108 open, it is possible to vary the number of spring washers allocated to these valves during assembly. The more spring washers are allocated to a valve, the higher is the differential pressure required for the respective valve to open.

In the figure a velocity/damping force diagram is represented in which a lower curve 130 and a center curve 132 represent the velocity/damping force line of conventional suspension damper devices, whereas an upper curve 134 represents the velocity/damping force line of the suspension damper device 1 of the invention by way of example. Conventional suspension damper devices do not have three effective valves in their compression phase, as is provided in the suspension damper device 1 of the invention. This results in the two-part line of the curves 130 and 132. The curve 130 is a suspension damper device adjusted to "soft." Here a first valve of the compression phase is provided which controls a volume flow of a fluid of a damping means up to a velocity of about 5 cm/s. At higher velocities a pressure relief valve is provided which clears a sufficiently large opening cross-section for the volume flow so that a damping force does not increase further. Although a load on the suspension damper device is low in this case, this may nevertheless disadvantageously result in bottoming of the suspension damper device in the event of strong impacts of a rear swing arm.

The curve 132 shows a suspension damper device of the prior art having a "harder" setting. Up to a velocity of about 5 cm/s a damping force in the compression phase increases more strongly than in the curve 130, so that bottoming of the suspension damper device rather is not possible any more. Here, too, a pressure relief valve opens at higher velocities, so that compression forces hardly increase any further.

Other than the curves 130 and 132, the curve 134 is composed of three parts. In the first part in the velocity range between 0 and 2 cm/s and thus in a slow velocity range, the valve 54 of FIG. 2 is active in the compression phase. If the velocity increases further to about 4 cm/s, then the valve 56 in FIG. 2 opens, so that the compression forces increase less than in the slow velocity range. Following this medium velocity range from about 4 cm/s, the third valve 58 then opens to further decrease the increase in compression forces. With the aid of the three valves 54, 56 and 58 of FIG. 2 it is thus possible to perform a comparatively fine adjustment of a velocity/damping force line. It is another advantage that owing to the presence of two valves 56 and 58 in the medium to high velocity ranges, their respective cleared opening cross-section may be less than with the pressure relief valves from the prior art. As a result, the valves 56 and 58 comparatively rapidly return into their closing positions when the compression phase of the suspension damper device is terminated and thrust reversal sets in, in which the pneumatic suspension means rebounds.

The suspension damper device 1 of FIG. 1 is characterized by its flexibility of adjustment and in particular by its flexibility in the initial setup, i.e., during its assembly. By simply altering the number of spring washers of the respective valves it is possible to achieve a multiplicity of desired damping characteristics without having to carry out further modifications in the suspension damper device 1. What is extremely advantageous in the present suspension damper device 1 is a two-stage overload protection by means of the two valves 56 and 58 of FIG. 2. Here it should be noted that in the closed or half-closed condition of the compression valve body 70, impacts of up to 2 m/s may occur during use of a bicycle having the suspension damper device. In suspension forks where the suspension damper device may in principle also be employed, the impacts may be as high as up to 4 m/s. In the compression phase, the suspension damper device 1 substantially has to achieve two objectives: at an extremely high acceleration of a running wheel of the bicycle allocated to a rear swing connected to the suspension damper device 1, which acts in the direction of the suspension damper device, it is to prevent bottoming of the suspension damper device 1. To this end the compression phase should substantially be terminated shortly before the end of a damper stroke, and thrust reversal should follow. Due to their inertia, running wheels having a higher weight accordingly require higher damping forces then more lightweight running wheels. Following thrust reversal after the compression phase, the suspension damper device 1 rebounds, and return phase damping sets in. Another objective of compression damping is to avoid excessive rebound of the suspension of the bicycle at particular push frequencies, for example while a rider is in the standing position; to this end the compression valve body 46 is set to be half open, which is then the so-called "platform damping." In this case a limited volume flow of the fluid may still flow via the valve 54 of FIG. 2, whereby a certain degree of cushioning is maintained. If the compression valve body 46 is closed completely, this is the so-called "lockout mode" in which no volume flow can flow via the valve 54 of FIG. 2 any more. This may in consequence result in a loss of traction in difficult terrain.

In case a rider forgets to open the compression valve body 46 in difficult terrain, the valves 56 and 58 of FIG. 2 serve as an overload protection. In the prior art this overload protection is hard to set based on a single valve. If the valve is set too low, i.e., it opens already at low pressure differences in order to achieve sensitive response, the likelihood of bottoming will increase. If, on the other hand, the overload protection is selected too high, then the suspension becomes very coarse in the medium velocity range of the suspension damper device 1, which is the most frequent condition of use. It is for this reason that the present suspension damper device exhibits 1 a "threefold partition" of the damping characteristics so as to be able to respond appropriately to impacts in the low (low-speed dampening), medium (midspeed dampening) and high velocity range (high-speed dampening). The overload protection (high-speed compression dampening unit) is distributed in the two valves 56 and 58 of FIG. 2. The valve 56 is in particular intended to regulate a volume flow of the fluid and the thrust reversal at medium and high compression velocities. In the prior art, the volume flow frequently is not sufficient in extreme situations, with the suspension damper device 1 being either subjected to high loads at a stiff damping adjustment, or tending to bottom at a soft adjustment. The present suspension damper device 1 also allows to react to such extreme impacts, to admit a high volume flow owing to the valve 58, and to immediately initiate thrust reversal towards the end of the compression phase. Hereby the risk of bottom owing to the running wheel inertia (the heavier, the higher the inertia) is reduced while the rider nevertheless is provided with sufficient suspension travel in extreme situations to safely overcome obstacles. At the same time the suspension damper device 1 retains sufficient sensitivity in regular riding operation.

Figure 7:
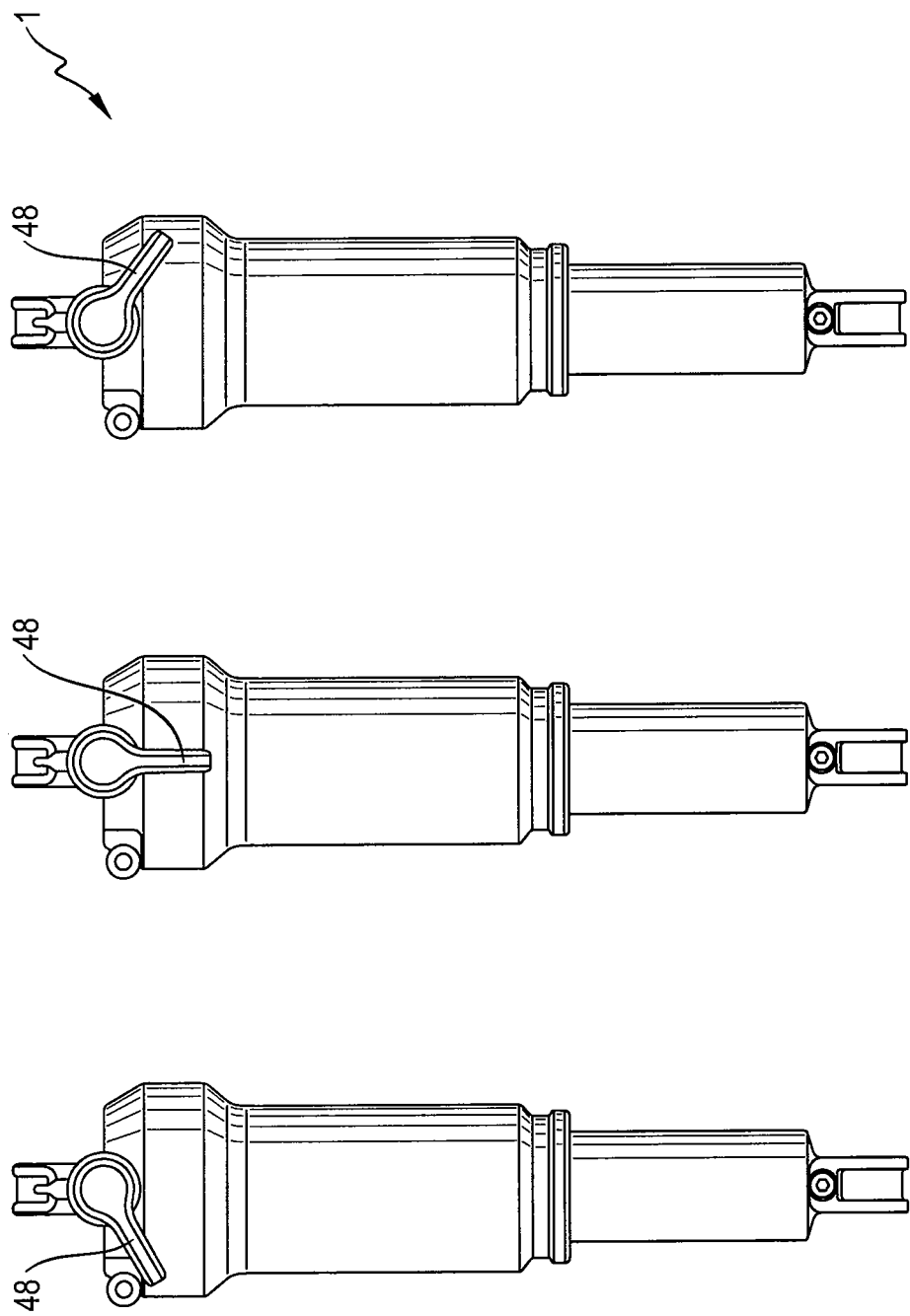
FIG. 7 shows lateral views of the suspension damper device according to the practical example.

FIG. 7 shows in a lateral view the suspension damper device 1 with three different positions of the lever 48. In the center representation the lever 48 is oriented approximately in a longitudinal direction of the suspension damper device 1. In this position the compression valve body, see FIGS. 1 and 2, is in a fully open position. In the prior art, on the other hand, the lever is oriented at an angle with the longitudinal axis in a fully opened position of the compression valve body 46, as is represented in the adjacent figures. Due to orientation along the longitudinal axis of the lever 48 in accordance with the invention, an operator may ascertain clearly that the compression valve body 46 is fully opened. In the right figure the lever has been pivoted counter-clockwise by about 45° to the right in its center position. Here the compression valve body 46 is in an approximately half-open position referred to as a "platform mode." In the left figure the lever 48 has been pivoted clockwise by about 45° against the longitudinal axis, with the compression valve body 46 then being in the "lockout mode" and closed. In conventional suspension damper devices a compression valve body is usually fully opened when the lever has been pivoted as in the left figure, half open at an orientation of the lever against the longitudinal axis, and closed at an orientation corresponding to the right figure. For the rider or operator it is, however, more reasonable to go by the center position from where he may then very quickly select one of the two settings (half open, closed). Besides the shown three gradations it would be conceivable to provide further gradations of an open position of the compression valve body 46, for example eight gradations. This would then be controlled by the realization of cams 134, see FIG. 1, through which the lever 48 cooperates via its lever axle 50 with the compression valve body 46.

In FIG. 1 a spacer 136, the size of which determines the adjustment of the volume of the annular space 52, is arranged in the area of the housing 2 or cylinder bottom.

At an inner diameter of the annular spaces 52 the compression ratio (decompression volume/compression volume) may be at least 2.8 in a fully compressed condition. By adding a spacer 136 this ratio may be adapted to, say, 4.0 in order to meet the various requirements of the suspension kinematics. In conventional suspension damper devices, adjusting the compression ratio is achieved through different airchamber casings (aircan), which is comparatively costly. The spacer 136 in FIG. 1 has a pot-type shape and has a through opening whereby it is placed on the axial protrusion 38 and fixedly connected to the latter. Its concave inner space faces away from the housing 2. The spacer may, e.g., be made hollow in order to save weight, or may consist of closed-cell plastic. Adapting a cushioning characteristic line of the suspension means with the aid of the spacer has the purpose of furnishing maximum utilization of the suspension travel as well as a characteristic line as linear as possible.

The invention claimed is:

1. A suspension damper device comprising a housing adapted to be affixed, a suspension means supported by the housing and which may be tensed in a direction of suspension via a damper body of a damping means adapted to be connected to a component to be dampened, wherein in the damper body a damper piston fixedly connected to the housing is guided which physically separates two damper spaces in the damper body, whereby the two damper spaces are a cylinder space and an annual space, characterized in that three valves are provided whereby through these valves a volume flow of a fluid between the damping spaces is controlled during tensing of the suspension means in the direction of suspension, wherein the three valves each open a fluid connection between the cylinder space and the annular space when a respective predetermined pressure difference between the cylinder space and the annular space is exceeded during tensing of the suspension means in the direction of suspension, and close the fluid connection when the pressure difference drops below the respective predetermined pressure difference, and wherein the first valve comprises an annular valve body which is guided via the guide rod and is braced via a spring washer against an end face of the damper piston, said valve body clearing a first connection recess provided in the damper piston between the cylinder space and the annular space at said defined pressure difference against a resilient force of the valve spring.

2. The suspension damper device according to claim 1, wherein the damper piston is fixedly connected to a guide rod affixed to the housing and separates the cylinder space from the annular space through which the guide rod extends, wherein the three valves each control a volume flow of the fluid through the damper piston.

3. The suspension damper device according to claim 1, wherein the second valve comprises a spring washer encompassed by the valve body of the first valve and affixed to the guide rod, which elastically bends at said defined pressure difference and clears a connection of a second connection recess provided in the damper piston between the cylinder space and the annular space.

4. The suspension damper device according to claim 3, wherein a guide ring affixed to the guide rod for guiding the valve body of the first valve is arranged between the spring washer of the second valve and the damper piston, said guide ring having a through opening in fluid communication with the second connection recess which may be opened and closed by the spring washer of the second valve.

5. The suspension damper device according to claim 1, wherein the third valve is a control valve which controls a flow path from the cylinder space to the annular space.

6. The suspension damper device according to claim 1, wherein the number of the spring washers allocated to the first and/or the second valve is variable.

7. The suspension damper device according to claim 1, wherein the annular valve body of the first valve comprises a support shoulder extending away from the damper piston, whereby the latter is supported against the valve spring.

8. The suspension damper device according to claim 7, wherein in the support shoulder of the annular valve body of the first valve at least one through opening for establishing a fluid connection between a valve space delimited by the valve body, the valve spring, the spring washer and the guide ring, and the annular space of the damper body.

9. The suspension damper device according to claim 3, wherein between an outer jacket surface of the guide ring and an inner jacket surface of the annular valve body of the first valve at least one flow recess is provided through which the cylinder space and the annular space of the damper body are in fluid connection in the opened condition of the first and the second valve.

10. The suspension damper device according to claim 9, wherein the at least one flow recess is provided as a longitudinal groove in the inner jacket surface of the annular valve body.

* * * * *